(12) United States Patent
You et al.

(10) Patent No.: US 8,743,911 B2
(45) Date of Patent: Jun. 3, 2014

(54) SYNCHRONIZATION METHOD AND DEVICE (75) Inventors: Yueyi You, Guangdong Province (CN); Qiang Li, Guangdong Province (CN); Ning Qiu, Guangdong Province (CN); Nanshan Cao, Guangdong Province (CN); Tao Zhang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 257 days.

(21) Appl. No.: 13/257,920

(22) PCT Filed: Mar. 25, 2010

(86) PCT No.: PCT/CN2010/071329
§ 371 (c)(1),
(2), (4) Date: Nov. 23, 2011

(87) PCT Pub. No.: WO2010/135927
PCT Pub. Date: Dec. 2, 2010

(65) Prior Publication Data
US 2012/0099608 A1    Apr. 26, 2012

(30) Foreign Application Priority Data
May 26, 2009    (CN) .......................... 2009 1 0202983

(51) Int. Cl.
*H04J 3/06* (2006.01)
(52) U.S. Cl.
USPC ........................................................ 370/503
(58) Field of Classification Search
USPC ........................................................ 370/503
See application file for complete search history.

(56) References Cited

U.S. PATENT DOCUMENTS

| | | | |
|---|---|---|---|
| 6,912,474 B2* | 6/2005 | Richmond | ..................... 702/125 |
| 2002/0105903 A1 | 8/2002 | Takahashi et al. | |
| 2007/0147533 A1* | 6/2007 | Thomas et al. | ............... 375/267 |
| 2011/0122972 A1* | 5/2011 | Lie et al. | ....................... 375/316 |

FOREIGN PATENT DOCUMENTS

CN    1921470 A    2/2007

OTHER PUBLICATIONS

International Search Report for PCT/CN2010/071329 dated Jun. 22, 2010.

* cited by examiner

*Primary Examiner* — Sulaiman Nooristany
(74) *Attorney, Agent, or Firm* — Ling Wu; Stephen Yang; Ling and Yang Intellectual Property (57) ABSTRACT

A synchronization method is disclosed, including: obtaining a synchronization symbol position $\hat{d}_0$ of one time slot of an initial update period; taking $N_{track}$ frames as an update period to adjust the synchronization symbol position, and the step of adjusting the synchronization symbol position including: obtaining a synchronization symbol position $\hat{d}_{k+1} = \hat{d}_k + N_{track}\hat{T}_k$ of a corresponding time slot of a $(k+1)^{th}$ update period according to a synchronization symbol position $\hat{d}_k$ of a corresponding time slot of a $k^{th}$ update period and an inter-frame sampling derivation estimation value $\hat{T}_k$ of said $k^{th}$ update period; obtaining synchronization symbol positions of other time slots in said $k^{th}$ update period according to the synchronization symbol position $\hat{d}_k$ of the corresponding time slot of the $k^{th}$ update period and the inter-frame sampling derivation estimation value $\hat{T}_k$ of said $k^{th}$ update period. A synchronization apparatus is also disclosed. The method and apparatus reduces synchronization calculation amount.

18 Claims, 4 Drawing Sheets

| TxID | Synchronizing signal | Synchronizing signal |
|---|---|---|

SYNCHRONIZATION METHOD AND DEVICE

TECHNICAL FIELD

The invention relates to a synchronization technique of the wireless communication technical field, and particularly, to a synchronization method and apparatus.

BACKGROUND OF THE RELATED ART

The State Administration of Radio Film and Television issued the China mobile multimedia broadcasting (CMMB) industry standard in October, 2006, which adopts the orthogonal frequency division multiplexing (OFDM) technique. The OFDM technique is a known multi-carrier modulation technique, and main principle of the OFDM technique is: dividing a channel into a plurality of orthogonal sub channels, converting the high-speed data into concurrent low-speed sub data streams, and modulating the low-speed sub data streams to each orthogonal sub channel for transmission. In the receiving end, a correlation technique can be adopted to separate orthogonal signals, thereby reducing the interference with each other among the orthogonal sub channels. The bandwidth of each orthogonal sub channel is less than the correlated bandwidth of the channel, and hence, each orthogonal sub channel can be considered as flat fading, thereby the interference among symbols being able to be eliminated. Furthermore, since the bandwidth of each orthogonal sub channel is only a small part of bandwidth of the original channel, so the channel equalization becomes easy relatively. The OFDM has been used in a plurality of wireless system standards at present, such as the Europe digital audio and digital video broadcast systems (DAB, DVB-T, and DVB-H), and 5 GHz high data speed wireless LAN (IEEE802.11a, HiperLan2, MMAC) systems and so on.

Figure 1:
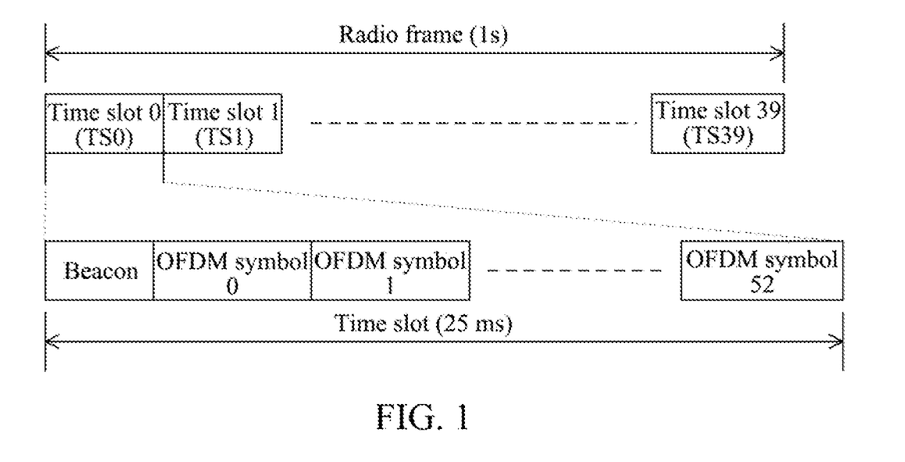
FIG. 1 is schematic diagram of a frame structure based on a time slot division in an existing CMMB system.
Figure 2:
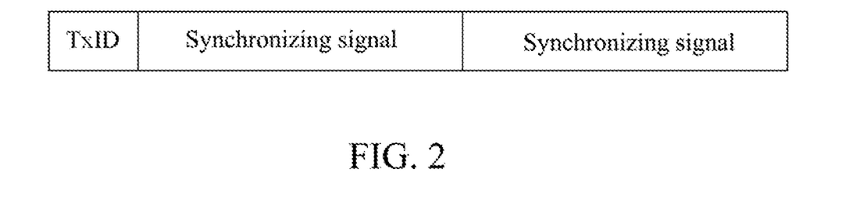
FIG. 2 is a schematic diagram of an existing beacon structure.

The CMMB system proposed a new physical layer frame structure, as shown in FIG. 1, wherein one radio frame includes 40 time slots, and each time slot includes one beacon and a plurality of OFDM symbols. FIG. 2 provides a schematic diagram of a beacon structure in each time slot in a frame structure of the physical layer of the CMMB system, wherein one beacon is composed of one transmitter identification sequence (TxID) and two same synchronization signals (SYNC). The time duration of each synchronization signal is 204.8 microseconds.

The synchronization problem is a practical problem which should be solved by any one communication system at first, and the performance of the synchronization directly affects the performance of the whole communication system. It is unable to have reliable data transmission without a robust and correct synchronization algorithm. The OFDM synchronization process usually includes two processes of a coarse synchronization and a fine synchronization. The coarse synchronization is to use a sliding autocorrelation at first, and then search the peak value of the sliding autocorrelation to obtain a coarse synchronization position; and the fine synchronization is generally obtained by detecting the first effective path of a channel impulse response after obtaining the coarse synchronization position.

In the synchronization algorithm in the related art, it usually adopts the coarse synchronization plus the fine synchronization for each synchronization symbol to obtain the synchronization position, and the calculation complexity of the synchronization algorithm is high. Besides, an abnormal value will appear when the deep fading occurs on the synchronization symbol, and therefore, the existing synchronization method is not stable enough.

SUMMARY OF THE INVENTION

The problem to be solved in the invention is to provide a synchronization method and apparatus, and the complexity of this method is lower and the performance is stable.

In order to solve the above problem, the invention provides a synchronization method, comprising:

obtaining a synchronization symbol position $\hat{d}_0$ of one time slot of an initial update period;

taking $N_{track}$ frames as an update period to adjust the synchronization symbol position, and the step of adjusting the synchronization symbol position comprising: obtaining a synchronization symbol position $\hat{d}_{k+1} = \hat{d}_k + N_{track}\hat{T}_k$ of a corresponding time slot of a $(k+1)^{th}$ update period according to a synchronization symbol position $\hat{d}_k$ of a corresponding time slot of a $k^{th}$ update period and an inter-frame sampling derivation estimation value $\hat{T}_k$ of said $k^{th}$ update period; wherein the corresponding time slot refers to a time slot corresponding to a position of said time slot of said initial update period;

obtaining synchronization symbol positions of other time slots in said $k^{th}$ update period according to the synchronization symbol position $\hat{d}_k$ of the corresponding time slot of the $k^{th}$ update period and the inter-frame sampling derivation estimation value $\hat{T}_k$ of said $k^{th}$ update period, wherein the inter-frame sampling derivation estimation value $\hat{T}_k$ refers to an estimation value of a synchronization symbol position derivation in one frame, $k \geq 0$;

so as to implement a timing synchronization.

The step of obtaining the synchronization symbol position $\hat{d}_0$ of said time slot of the initial update period comprises:

carrying out a coarse synchronization in continuous $N_{coarse}$ time slots to obtain $N_{coarse}$ normalized synchronization positions $x_0, x_1, \ldots, x_{N_{coarse}-1}$, and carrying out median filtering on the $x_0, x_1, \ldots, x_{N_{coarse}-1}$ to obtain an initial synchronization position $\hat{d}_{coarse}$; wherein the $N_{coarse}$ is the number of time slots searched continuously in the coarse synchronization;

obtaining coarse positions of synchronization symbols according to the initial synchronization position $\hat{d}_{coarse}$ and a period of the synchronization symbols occurring in a sending end;

carrying out a fine synchronization for $N_{acq}$ times on the synchronization symbols in continuous $N_{acq}$ time slots to obtain $N_{acq}$ normalized synchronization positions $x'_0, x'_1, \ldots, x'_{N_{acq}-1}$, and obtaining said synchronization symbol position $\hat{d}_0$ after carrying out the median filtering on the $x'_0, x'_1, \ldots, x'_{N_{acq}-1}$; wherein, the $N_{acq}$ is the number of time slots searched continuously in inter-frame sampling capturing.

An inter-frame sampling derivation estimation value $\hat{T}_{k+1}$ of the $(k+1)^{th}$ update period is obtained by a following formula:

$$\hat{T}_{k+1} = \begin{cases} \alpha \hat{T}_k + (1-\alpha)\hat{T}_{track,k+1}, & |\hat{T}_k - \hat{T}_{track,k+1}| \leq Th_{dec} \\ \hat{T}_k & \text{others}; \end{cases}$$

wherein, the $Th_{dec}$ is a judgment threshold of whether a track value is abnormal, the $\alpha$ is a weighting factor, $0 \leq \alpha \leq 1$, the $\hat{T}_k$ is the inter-frame sampling derivation estimation value of the $k^{th}$ update period, the $\hat{T}_{track,k+1}$ is an inter-frame sampling derivation track value of the $(k+1)^{th}$ update period, $k \geq 0$, the inter-frame sampling derivation estimation value of the initial update period is $\hat{T}_0$; and a way of calculating the $\hat{T}_{track,}$ $k+1$ comprises: estimating the synchronization symbol position of an initial time slot of each frame in the $(k+1)^{th}$ update period, making subtraction on the synchronization symbol positions of the initial time slots of all the frames to obtain an inter-frame sampling derivation of each adjacent frames, and obtaining the $\hat{T}_{track,k+1}$ according to the inter-frame sampling derivation of each adjacent frames.

The inter-frame sampling derivation estimation value $\hat{T}_0$ of the initial update period is obtained by following steps:

shifting the position $\hat{d}_0$ M sampling points backwards after obtaining the synchronization symbol position $\hat{d}_0$ of the initial update period, wherein the M is the number of sampling points in one frame, carrying out the fine synchronization for $N_{acq}$ times on the synchronization symbols in the continuous $N_{acq}$ time slots to obtain $N_{acq}$ normalized synchronization positions $x''_0, x''_1, \ldots, x''_{N_{acq}-1}$, and obtaining $\hat{d}_{a1}$ after carrying out the median filtering on the $x''_0, x''_1, \ldots, x''_{N_{acq}-1}$; and making subtraction on the $\hat{d}_{a1}$ and $\hat{d}_0$ to obtain the inter-frame sampling derivation estimation value $\hat{T}_0 = \hat{d}_{a1} - \hat{d}_0$ in the initial update period.

The inter-frame sampling derivation track value $\hat{T}_{track,k+1}$ of the $k+1^{th}$ update period is obtained by following steps:

3a, in the $(k+1)^{th}$ update period, shifting the synchronization symbol position $\hat{d}_{k+1}$ of the corresponding time slot of the synchronization symbol of the $(k+1)^{th}$ update period M sampling points backwards to cut and obtain a synchronization symbol of a same time slot of a next frame, wherein, M is the number of sampling points of each frame;

3b, carrying out a fine synchronization estimation on the cut synchronization symbol to obtain a new normalized synchronization symbol position $\hat{d}_i$, and taking an initial position of the cut synchronization symbol during normalization as 0;

3c, obtaining the inter-frame sampling derivation estimation value $\hat{y}_i = \hat{d}_i$ of once;

3d, estimating $N_{track}$ inter-frame sampling derivation estimation values $\hat{y}_0, \hat{y}_1, \ldots, \hat{y}_{N_{track}-1}$ in the $(k+1)^{th}$ update period according to the above steps 3a, 3b and 3c;

3e, carrying out the median filtering on the $\hat{y}_0, \hat{y}_1, \ldots, \hat{y}_{N_{track}-1}$ to obtain the inter-frame sampling derivation track value $\hat{T}_{track}$ of the $(k+1)^{th}$ update period.

If the corresponding time slot of the $k^{th}$ update period is an initial time slot of the $k^{th}$ update period, then a value of a synchronization symbol position $s_{i,j}^{(k)}$ of a $j^{th}$ time slot of a $i^{th}$ frame in other time slots in the $k^{th}$ update period is as follows:

$$s_{i,j}^{(k)} = \hat{d}_k + \frac{\hat{T}_k}{N_{slot}}(N_{slot} \cdot i + j),$$

wherein, $0 \leq i \leq N_{track}-1$ and $0 \leq j \leq N_{slot}-1$, and the $N_{slot}$ is the number of time slots included in each frame.

The invention further provides a synchronization apparatus, comprising:

an initial synchronization symbol position obtaining module, which is configured to obtain a synchronization symbol position $\hat{d}_0$ of one time slot of an initial update period;

an inter-frame sampling derivation estimation value obtaining module, which is configured to obtain an inter-frame sampling derivation estimation value $\hat{T}_k$ of a $k^{th}$ update period; wherein, the inter-frame sampling derivation estimation value $\hat{T}^k$ refers to an estimation value of a synchronization symbol position derivation in one frame, $k \geq 0$;

an updating module, which is configure to take: $N_{track}$ frames as an update period, obtain a synchronization symbol position $\hat{d}_{k+1} = \hat{d}_k + N_{track}\hat{T}_k$ of a corresponding time slot of a $(k+1)^{th}$ update period according to a synchronization symbol position $\hat{d}_k$ of a corresponding time slot of the $k^{th}$ update period and the inter-frame sampling derivation estimation value $\hat{T}_k$ of said $k^{th}$ update period; wherein, the corresponding time slot refers to a time slot corresponding to a position of said time slot of said initial update period; and a synchronization forecasting module, which is configured to obtain synchronization symbol positions of other time slots in said $k^{th}$ update period according to the synchronization symbol position $\hat{d}_k$ of the corresponding time slot of the $k^{th}$ update period and the inter-frame sampling derivation estimation value $\hat{T}_k$ of said $k^{th}$ update period;

so as to implement a timing synchronization.

Said initial synchronization symbol position obtaining module comprises:

an initial synchronization position obtaining unit, which is configured to carry out a coarse synchronization in continuous $N_{coarse}$ time slots to obtain $N_{coarse}$ normalized synchronization positions $x_0, x_1, \ldots, x_{N_{coarse}-1}$, and carry out a median filtering on the $x_0, x_1, \ldots, x_{N_{coarse}-1}$ to obtain an initial synchronization position $\hat{d}_{coarse}$; wherein, the $N_{coarse}$ is the number of time slots searched continuously in the coarse synchronization;

a fine synchronization unit, which is configured to obtain coarse positions of synchronization symbols according to the initial synchronization position $\hat{d}_{coarse}$ and a period of the synchronization symbols occurring in a sending end, carry out a fine synchronization for $N_{acq}$ times on the synchronization symbols in continuous $N_{acq}$ time slots to obtain $N_{acq}$ normalized synchronization positions $x'_0, x'_1, \ldots, x'_{N_{acq}-1}$; and a filtering unit, which is configured to obtain said synchronization symbol position $\hat{d}_0$ after carrying out the median filtering on the $x'_0, x'_1, \ldots, x'_{N_{acq}-1}$; wherein, the $N_{acq}$ is the number of time slots searched continuously in inter-frame sampling capturing.

Said inter-frame sampling derivation estimation value obtaining module comprises:

an initial estimation unit, which is configured to obtain the inter-frame sampling derivation estimation value $\hat{T}_0$ of the initial update period;

a tracking unit, which is configured to track inter-frame sampling derivations of the $(k+1)^{th}$ update period, and obtain an inter-frame sampling derivation track value $\hat{T}_{track,k+1}$ of $(k+1)^{th}$ update period, wherein, the $\hat{T}_{track,k+1}$ is obtained by estimating the synchronization symbol position of an initial time slot of each frame in the $(k+1)^{th}$ update period, making subtraction on the synchronization symbol positions of the initial time slot of each frame to obtain the inter-frame sampling derivation of each adjacent frames, and obtaining the $\hat{T}_{track,k+1}$ according to the inter-frame sampling derivation of each adjacent frames; and a generation unit, which is configured to generate the inter-frame sampling derivation estimation value $\hat{T}_{k+1}$ of the $(k+1)^{th}$ update period by a following formula:

$$\hat{T}_{k+1} = \begin{cases} \alpha\hat{T}_k + (1-\alpha)\hat{T}_{track,k+1}, & |\hat{T}_k - \hat{T}_{track,k+1}| \leq Th_{dec} \\ \hat{T}_k & \text{others;} \end{cases}$$

wherein, the $Th_{dec}$ is a judgment threshold of whether a track value is abnormal, the $\alpha$ is a weighting factor, $0 \geq \alpha \geq 1$, the $\hat{T}_k$ is the inter-frame sampling derivation estimation value of the $k^{th}$ update period, the $\hat{T}_{track,k+1}$ is the inter-frame sampling derivation track value of the $(k+1)^{th}$ update period, and $k \geq 0$.

Said initial estimating unit is configured to obtain the inter-frame sampling derivation estimation value $\hat{T}_0$ of the initial update period as a following way:

shifting the synchronization symbol position $\hat{d}_0$ M sampling points backwards after obtaining the synchronization symbol position $\hat{d}_0$ of the initial update period, wherein the M is the number of sampling points in one frame, carrying out the fine synchronization for $N_{acq}$ times on the synchronization symbols in the continuous $N_{acq}$ time slots to obtain $N_{acq}$ normalized synchronization positions $x''_0, x''_1, \ldots, x''_{N_{acq}-1}$, and obtaining $\hat{d}_{a1}$ after carrying out the median filtering on the $x''_0, x''_1, \ldots, x''_{N_{acq}-1}$; and making subtraction on the $\hat{d}_{a1}$ and $\hat{d}_0$ to obtain the inter-frame sampling derivation estimation value $\hat{T}_0 = \hat{d}_{a1} - \hat{d}_0$ in the initial update period.

Said tracking unit comprises:

a cutting sub-unit, which is configured to, in the $(k+1)^{th}$ update period, shift the synchronization symbol position $\hat{d}_{k+1}$ of the corresponding time slot of the synchronization symbol of the $(k+1)^{th}$ update period M sampling points backwards to cut and obtain a synchronization symbol of a corresponding time slot of a next frame, wherein, M is the number of sampling points of each frame, and the number of cutting and obtaining is $N_{track}$;

an estimation sub-unit, which is configured to carry out a fine synchronization estimation on the cut synchronization symbol every time to obtain a new normalized synchronization symbol position $\hat{d}_i$, $0 \leq i \leq N_{track} - 1$, and take an initial position of the cut synchronization symbol during normalization as 0;

an sampling derivation estimation value obtaining sub-unit, which is configured to obtain the inter-frame sampling derivation estimation value $\hat{y}_i = \hat{d}_i$ according to the normalized synchronization symbol position $\hat{d}_i$ obtained by the estimation sub-unit, $0 \leq i \leq N_{track} - 1$; and a filtering sub-unit, which is configured to: carry out the median filtering on the $\hat{y}_0, \hat{y}_1, \ldots, \hat{y}_{N_{track}-1}$ to obtain the inter-frame sampling derivation track value $\hat{T}_{track}$ of the $(k+1)^{th}$ update period.

Said synchronization forecasting module is configured to obtain the synchronization symbol positions of other time slots in said $k^{th}$ update period when the corresponding time slot of the $k^{th}$ update period is an initial time slot of the $k^{th}$ update period as a following way:

a value of a synchronization symbol position $s_{i,j}^{(k)}$ of a $j^{th}$ time slot of a $i^{th}$ frame in the other time slots being as follows:

$$s_{i,j}^{(k)} = \hat{d}_k + \frac{\hat{T}_k}{N_{slot}} \cdot (N_{slot} \cdot i + j),$$

$$0 \leq i \leq N_{track} - 1, 0 \leq j \leq N_{slot} - 1;$$

wherein, the $N_{slot}$ is the number of time slots included in each frame, and said $\hat{d}_k$ is the synchronization symbol position of the initial time slot of the $k^{th}$ update period.

PREFERRED EMBODIMENTS OF THE PRESENT INVENTION

In order to make the technical scheme in some embodiments and its technical advantages clearer, taking the China mobile multimedia broadcasting as an example, the technical scheme of obtaining the timing synchronization of the CMMB terminal proposed in the embodiments will be described in detail with reference to the accompanying drawings.

The broadcast system can make use of the periodicity of data frames of a broadcast transmitting signal to forecast a synchronization position, which not only reduces the complexity, but also improves the robustness and the precision of the synchronization.

The main concept is: firstly obtaining one synchronization symbol position $\hat{d}_0$ of an initial update period, then taking $N_{track}$ frames as an update period to adjust the synchronization symbol position, and the adjustment way being: obtaining a synchronization symbol position $\hat{d}_{k+1}$ of the $(k+1)^{th}$ update period according to a synchronization symbol position $\hat{d}_k$ and an inter-frame sampling derivation estimation value $\hat{T}_k$ of the $k^{th}$ update period, wherein an inter-frame sampling derivation estimation value $\hat{T}_{k+1}$ of the $(k+1)^{th}$ update period is a weighted sum of the inter-frame sampling derivation estimation value $\hat{T}_k$ of the $k^{th}$ update period and an inter-frame sampling derivation track value $\hat{T}_{track}$ of the $(k+1)^{th}$ update period, and the initial inter-frame sampling derivation estimation value $\hat{T}_0$ is obtained by capturing the inter-frame sampling derivations. In each update period, the synchronization symbol positions of other time slots are obtained according to $\hat{d}_k$ and the inter-frame sampling derivation estimation value $\hat{T}_k$, and the specific method can be referred as follows. For convenient description, embodiments will be illustrated by taking the synchronization symbol position of the first time slot of the first frame in the $k^{th}$ update period as the $\hat{d}_k$ (where the $\hat{d}_0$ is the synchronization symbol position of the initial time slot of the initial frame at this time).

Figure 3:
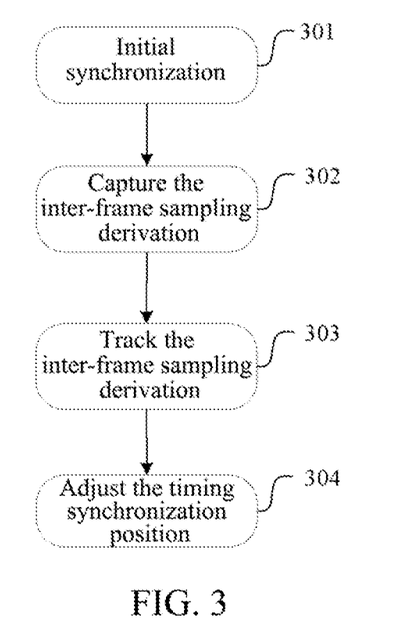
FIG. 3 is a flow chart of a timing synchronization method of a CMMB terminal according to an embodiment of the present invention.

A timing synchronization method is described, which is used for obtaining a synchronization position of a receiving signal in the terminal, and as shown in FIG. 3, the method comprises following steps.

Step 301, initial synchronization is carried out to obtain an initial synchronization position $\hat{d}_{coarse}$;

the initial synchronization is: carrying out a coarse synchronization in continuous $N_{coarse}$ time slots, estimating $N_{coarse}$ normalized synchronization positions which are $x_0, x_1, \ldots, x_{N_{coarse}-1}$ in sequence, and carrying out a median filtering on the estimated synchronization positions to obtain the initial synchronization position $\hat{d}_{coarse}$.

The above normalized synchronization positions are the synchronization symbols initial positions obtained by restarting to count initial sampling points from 0 after cutting data of a single time slot.

The coarse synchronization can be obtained by adopting a delay correlation or a matched filtering and then searching a peak value.

The median filtering obtaining the initial synchronization position $\hat{d}_{coarse}$ is to obtain the initial synchronization position $\hat{d}_{coarse}$ according to the following formula:

wherein $N_{coarse}$ estimation values $x_0, x_1, \ldots, x_{N_{coarse}-1}$ are arranged by the order of the values of the $N_{coarse}$ numeral as follows:

$$x_{i_0} \leq x_{i_1} \leq \ldots \leq x_{i_{N_{coarse}-1}},$$

then $$\hat{d}_{coarse} = \text{Median}\{x_0, x_1, \ldots, x_{N_{coarse}-1}\}$$

$$= \begin{cases} x_{i_{\left(\frac{N_{coarse}-1}{2}\right)}}, & N_{coarse} \text{ is an odd number} \\ \frac{1}{2}\left(x_{i_{\left(\frac{N_{coarse}}{2}-1\right)}} + x_{i_{\left(\frac{N_{coarse}}{2}\right)}}\right), & N_{coarse} \text{ is an even number.} \end{cases}$$

Step 302, the inter-frame sampling deviation is captured to obtain an inter-frame sampling deviation capture value $\hat{T}_{acq}$;

the inter-frame sampling deviation is a timing deviation in a unit frame caused by a oscillator deviation of a sampling clock, i.e., a synchronization symbol position deviation in one frame.

The process of capturing the inter-frame sampling deviation is as follows:

2a) coarse positions of the synchronization symbols are conjectured according to the initial synchronization position $\hat{d}_{coarse}$, i.e., the coarse positions of the synchronization symbols are obtained according to the initial synchronization position $\hat{d}_{coarse}$ and a period of the synchronization symbols occurring in a sending end;

2b) a fine synchronization is carried out for $N_{acq}$ times on the synchronization symbols in the continuous $N_{acq}$ time slots, $N_{acq}$ normalized synchronization positions $x'_0, x'_1, \ldots, x'_{N_{acq}-1}$ are obtained, and the median filtering is carried out on the $x'_0, x'_1, \ldots, x'_{N_{acq}-1}$ to obtain the $\hat{d}_{a1}$;

2c) synchronization symbols of the same time slots of the next frame are cut and obtained by shifting M sampling points backwards from $\hat{d}_{a1}$, the fine synchronization is carried out for $N_{acq}$ times on the synchronization symbols in the continuous $N_{acq}$ time slots, $N_{acq}$ normalized synchronization positions $x''_0, x''_1, \ldots, x''_{N_{acq}-1}$ are obtained, and the median filtering is carried out on the $x''_0, x''_1, \ldots, x''_{N_{acq}-1}$ to obtain the $\hat{d}_{a2}$;

2d) the $\hat{d}_{a1}$ and $\hat{d}_{a2}$ are carried out the subtraction to obtain the inter-frame sampling derivation capture value $\hat{T}_{acq} = \hat{d}_{a2} - \hat{d}_{a1}$.

Certainly, it also can adopt the similar way to estimate the $\hat{d}_{a3}, \hat{d}_{a4}, \ldots, \hat{d}_{an}$, and carry out the subtraction to obtain n–1 $\hat{T}_{acq}(s)$, and then carry out the median filtering to obtain the final inter-frame sampling derivation capture value $\hat{T}_{acq}$.

The above fine synchronization can be obtained by searching the first effective path of the channel impulse response.

Step 303, the inter-frame sampling derivation is tracked;

tracking the inter-frame sampling derivation is to track the inter-frame sampling derivation in each update period, which comprises: in each update period estimating the synchronization symbol position of the initial time slot of each frame in that update period, making the subtraction to obtain the inter-frame sampling derivation of each adjacent frames, and obtaining the inter-frame sampling derivation track value of that update period according to the inter-frame sampling derivation of each adjacent frames, which specifically is as follows:

3a) without loss of generality, it is assumed that the current synchronization symbol initial position is 0, and the synchronization symbol of the same time slot of the next are cut and obtained by shifting M sampling points backwards;

3b) the fine synchronization estimation is carried out on the synchronization symbol, the new normalized synchronization position $\hat{d}_i$ is obtained, and the synchronization symbol initial position cut in the normalization is taken as 0;

3c) the inter-frame sampling derivation estimation value $\hat{y}_i = \hat{d}_i$ of once is obtained;

3d) the inter-frame sampling derivation values $\hat{y}_0, \hat{y}_1, \ldots, \hat{y}_{N_{track}-1}$ of $N_{track}$ times are estimated according to the above steps;

3e) the median filtering is carried out on $\hat{y}_0, \hat{y}_1, \ldots, \hat{y}_{N_{track}-1}$ to obtain the inter-frame sampling derivation track value $\hat{T}_{track}$, that is:

$$\hat{T}_{track} = \text{Median}\{\hat{y}_0, \hat{y}_1, \ldots, \hat{y}_{N_{track}-1}\}.$$

Step 304, a timing synchronization position is adjusted;

adjusting the timing synchronization position comprises two parts of updating the inter-frame sampling derivation estimation value and adjusting the synchronization position of time slot level.

The process of updating the inter-frame sampling derivation estimation value $\hat{T}_k$ is as follows:

4a) during the initiation, the inter-frame sampling derivation estimation value $\hat{T}_k$ is obtained by the above process of capturing the inter-frame sampling derivation, i.e., $\hat{T}_0 = \hat{T}_{acq}$;

4b) the inter-frame sampling derivation estimation value $\hat{T}_k$ is adjusted once every $N_{track}$ frames, and it is assumed that the current inter-frame sampling derivation estimation value is $\hat{T}_k$, then $$\hat{T}_{k+1} = \begin{cases} \alpha \hat{T}_k + (1-\alpha)\hat{T}_{track,k+1}, & |\hat{T}_k - \hat{T}_{track,k+1}| \leq Th_{dec} \\ \hat{T}_k & \text{others,} \end{cases}$$

wherein, $\hat{T}_{track,k+1}$ is the inter-frame sampling derivation track value of the $(k+1)^{th}$ update period, which is also called as a track value; $\hat{T}_k$ is the inter-frame sampling derivation estimation value of the $k^{th}$ update period, which is also called as a history value; $Th_{dec}$ is a judgment threshold of whether the track value is abnormal, which is used for judging whether the track value is adopted to modify the inter-frame sampling derivation estimation value, and $\alpha$ is a weighting factor for estimating the inter-frame sampling derivation value by using the history value and the track value, and $0 \leq \alpha \leq 1$.

The above process of adjusting the synchronization position of the time slot level is as follows:

4c) during the initiation, the synchronization position $\hat{d}_0$ of the initial time slot of the initial frame is obtained by the above initial synchronization and the process of capturing the inter-frame sampling derivation, i.e., $\hat{d}_0 = \hat{d}_{a1}$;

4d) the period of adjusting the frame synchronization position is to update once every $N_{track}$ frames, each $N_{track}$ frames are taken as one super frame, and it is assumed that the synchronization symbol initial position of the first time slot of the first frame in the $k^{th}$ super frame is $\hat{d}_k$, then the corresponding synchronization symbol position of the first time slot of the first frame in the $(k+1)^{th}$ super frame is $\hat{d}_{k+1} = \hat{d}_k + N_{track}\hat{T}_k$, the corresponding synchronization symbol position of the first time slot of the first frame in the $(k+2)^{th}$ super frame is $\hat{d}_{k+2}=\hat{d}_{k+1}+N_{track}\hat{T}_{k+1}$, and so on.

4e) the synchronization symbol initial position of each time slot in the super frame is calculated according to the synchronization symbol position of the super frame. It is assumed that the synchronization symbol initial position of the $j^{th}$ time slot of the $i^{th}$ frame in the $k^{th}$ super frame is $s_{i,j}^{(k)}$, then:

$$s_{i,j}^{(k)} = \hat{d}_k + \frac{\hat{T}_k}{N_{slot}} \cdot (N_{slot} \cdot i + j),$$

$$0 \le i \le N_{track} - 1, \; 0 \le j \le N_{slot} - 1,$$

wherein, the $N_{slot}$ is the number of time slots included in each frame, which is determined by a specific system configuration, for example the $N_{slot}$ is fixed to 40 in the CMMB standard.

4f) a FFT window initial position of each OFDM symbol is calculated according to synchronization symbol initial position $s_{i,j}^{(k)}$ of the time slot, and since the timing derivation existing between the head and tail sampling points is not large, it can be considered that the sampling derivation does not exist in the time slot.

Below the method in some embodiments will be described in detail with reference to a specific embodiment.

One embodiment of the timing synchronization method in the CMMB terminal is provided in the following, and each parameter in the embodiment is shown as table 1:

TABLE 1

Table of main parameters of the embodiment

| Parameter | Parameter value | Meaning of parameter |
|---|---|---|
| M | $10^7$ | The number of sampling points in a unit frame |
| $N_{coarse}$ | 3 | The number of continuously searched time slots in the initial synchronization process |
| $N_{acq}$ | 3 | The number of continuously searched time slots in a process of capturing the inter-frame sampling |
| $N_{track}$ | 3 | The update period of the inter-frame sampling derivation estimation value |
| $Th_{dec}$ | 40 | The judgment threshold of whether the track value is abnormal |
| α | 0.75 | The weighting factor of the history value and the track value of the inter-fame sampling derivation |

The specific steps of the flow of the timing synchronization according to the embodiment are as follows:

step 401, the initialization is carried out, and synchronization symbol position $\hat{d}_0$ of the initial time slot of the initial frame is obtained;

and the specific way is as follows:

the coarse synchronization is carried out in continuous 3 time slots to obtain 3 normalized synchronization positions, which are $x_0, x_1, x_2$ in sequence, and the median filtering is carried out to obtain the initial synchronization position $\hat{d}_{coarse} = \text{Median}\{x_0, x_1, x_2\}$;

the coarse positions of the synchronization symbols are conjectured according to the initial synchronization position $\hat{d}_{coarse}$;

the fine synchronization is carried out for 3 times on the synchronization symbols in the continuous 3 time slots, 3 normalized synchronization positions $x'_0, x'_1, x'_2$ are obtained, and $\hat{d}_0 = \text{Median}\{x'_0, x'_1, x'_2\}$ is obtained after the median filtering;

step 402, the inter-frame sampling derivation is captured to obtain the inter-frame sampling derivation capture value $\hat{T}_{acq}$, thereby obtaining the initial inter-frame sampling derivation estimation value $\hat{T}_0 = \hat{T}_{acq}$;

which specifically is as follows:

the coarse positions of the synchronization symbols are conjectured according to the initial synchronization position $\hat{d}_{coarse}$;

the fine synchronization is carried out for 3 times on the synchronization symbols in the continuous 3 time slots, 3 normalized synchronization positions $x_0, x_1, x_2$ are obtained, and $\hat{d}_{a1} = \text{Median}\{x_0, x_1, x_2\}$ is obtained after the median filtering;

the fine synchronization is carried out for 3 times on the synchronization symbols in the continuous 3 time slots by shifting M (herein $10^7$) sampling points backwards from the position $\hat{d}_{a1}$, 3 normalized synchronization positions $x_0, x_1, x_2$ are obtained, and $\hat{d}_{a2} = \text{Median}\{x_0, x_1, x_2\}$ is obtained after the median filtering;

$\hat{d}_{a1}$ and $\hat{d}_{a2}$ are carried out the subtraction to obtain the inter-frame sampling derivation capture value $\hat{T}_{acq} = \hat{d}_{a2} - \hat{d}_{a1}$.

Step 403, the inter-frame sampling derivation is tracked, which comprises:

cutting and obtaining the synchronization symbol of corresponding time slot in the next frame by shifting $10^7$ sampling points backwards from the current synchronization symbol position;

carrying out the fine synchronization estimation on the synchronization symbol, and the new normalized synchronization position $\hat{d}_t$ is obtained;

obtaining the inter-frame sampling derivation estimation value $\hat{y}_i = \hat{d}_t$ of once;

estimating the inter-frame sampling derivation values $\hat{y}_0, \hat{y}_1, \hat{y}_2$ of 3 times according to the above steps;

carrying out the median filtering $\hat{T}_{track} = \text{Median}\{\hat{y}_0, \hat{y}_1, \hat{y}_2\}$.

Step 404, the synchronization position is adjusted:

adjusting the timing synchronization position comprises two parts of updating the inter-frame sampling derivation estimation value and adjusting the synchronization position of the time slot level;

wherein updating the inter-frame sampling derivation estimation value $\hat{T}_k$ comprises:

adjusting the inter-frame sampling derivation estimation value once every $N_{track}$ frames, and it is assumed that the current estimation value is $\hat{T}_k$, then $$\hat{T}_{k+1} = \begin{cases} 0.75\hat{T}_k + 0.25\hat{T}_{track,k+1}, & |\hat{T}_k - \hat{T}_{track,k+1}| \le 40 \\ \hat{T}_k & \text{others;} \end{cases}$$

wherein the process of adjusting the synchronization position of the time slot level is as follows:

the frame synchronization position adjustment period is to update once every 3 frames, each 3 frames are considered as one super frame, and it is assumed that the synchronization symbol initial position of the first time slot of the first frame in the $k^{th}$ super frame is $\hat{d}_k$, and then the corresponding position of the $(k+1)^{th}$ super frame is $\hat{d}_{k+1} = \hat{d}_k + 3\hat{T}_k$, and so on;

the synchronization symbol position of each time slot in the super frame is calculated according to the synchronization position of the super frame. It is assumed that the synchronization symbol initial position of the $j^{th}$ time slot of the $i^{th}$ frame in the $k^{th}$ supper frame is $s_{i,j}^{(k)}$, then:

$$s_{i,j}^{(k)} = \hat{d}_k + \frac{\hat{T}_k}{40} \cdot (40i + j),$$

$$0 \le i \le 2, 0 \le j \le 39$$

the FFT window initial position of each OFDM symbol is calculated according to the synchronization symbol initial position $s_{i,j}^{(k)}$ of the time slot, and since the timing derivation existing between the head and tail sampling points is not large, it can be considered that the sampling derivation does not exist in the time slot.

In the above embodiment, the inter-frame sampling derivation estimation value is calculated at the interval of one frame, and also can be calculated at 2 or more frames; and if the inter-frame sampling derivation estimation value is calculated at p frames, the M is the number of sampling points of p frames at this time. Calculating the synchronization symbol position of each time slot in the same update period should also be changed accordingly.

Figure 4:
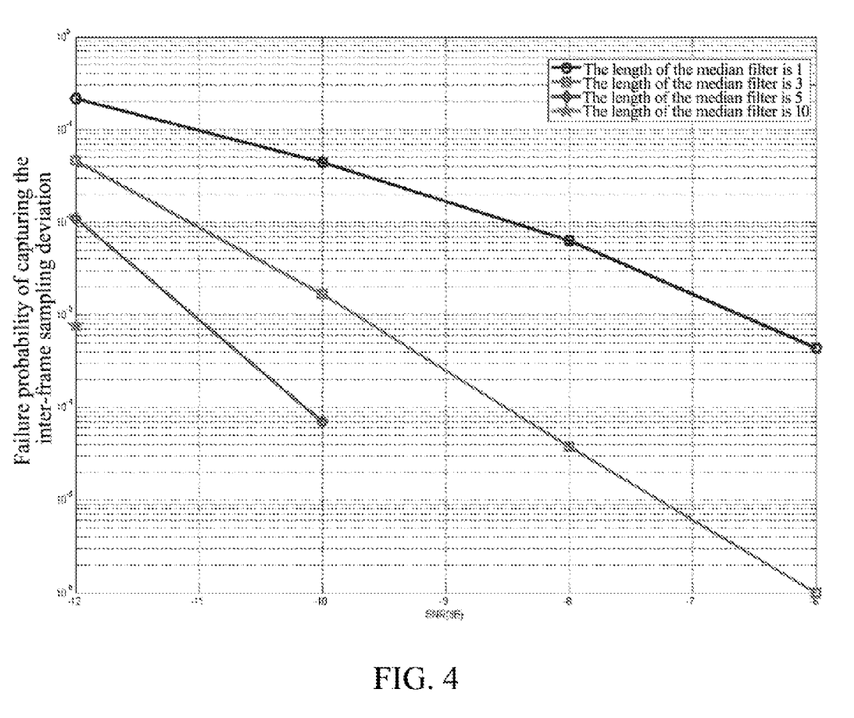
FIG. 4 is a schematic diagram of a failure probability of capturing an inter-frame sampling deviation under a median filter of different lengths according to an embodiment of the present invention.

FIG. 4 provides a failure probability of capturing the inter-frame sampling deviation of the median filter of different lengths according to the embodiment, and it can be seen from FIG. 4 that the failure probability of capturing the inter-frame sampling deviation is reduced along with the increase of the length of the median filter.

Figure 5:
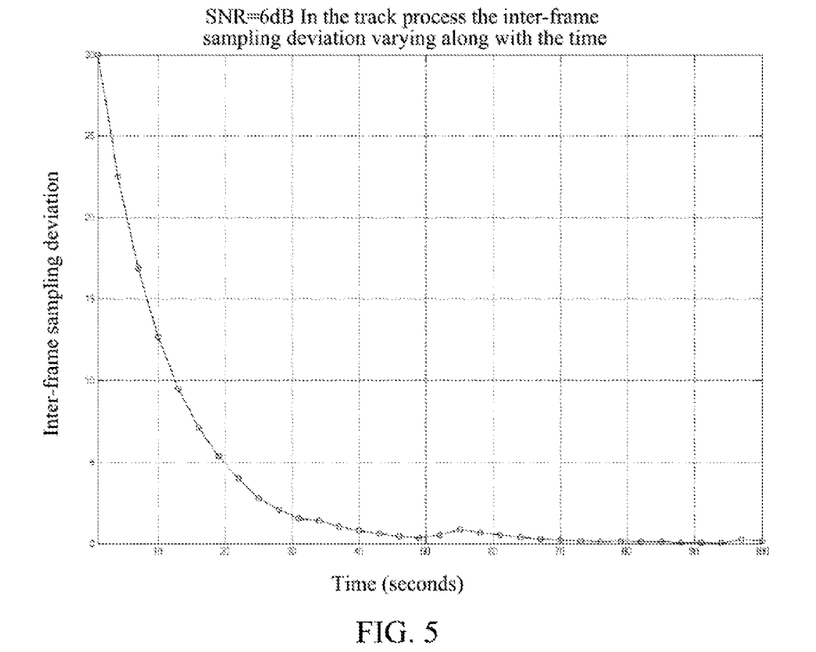
FIG. 5 is a schematic diagram of a inter-frame sampling deviation varying with the time in a track process according to an embodiment of the present invention.

FIG. 5 provides a schematic diagram of the inter-frame sampling deviation track value varying with the time according to the present invention, and it can be seen from FIG. 5 that, in the process of tracking, the inter-frame sampling deviation estimation error is convergent, and the inter-frame sampling deviation is reduced along with the increase of the time.

Figure 6:
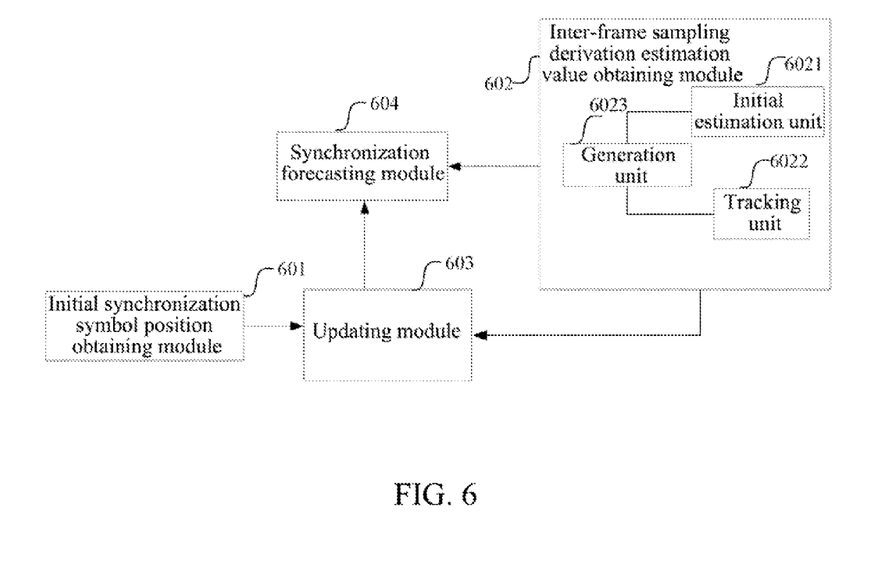
FIG. 6 is a block diagram of a timing synchronization apparatus according to an embodiment of the present invention.

A timing synchronization apparatus is further described, and as shown in FIG. 6, the apparatus comprises:

an initial synchronization symbol position obtaining module 601, which is used for obtaining the synchronization symbol position $\hat{d}_0$ of one time slot of the initial update period;

an inter-frame sampling derivation estimation value obtaining module 602, which is used for obtaining the inter-frame sampling derivation estimation value $\hat{T}_k$ of the $k^{th}$ update period; wherein the inter-frame sampling derivation estimation value $\hat{T}_k$ is the estimation value of the synchronization symbol position derivation in one frame, $k \ge 0$;

an updating module 603, which is used for taking $N_{track}$ frames as the period to update the synchronization symbol position, and obtaining the synchronization symbol position $\hat{d}_{k+1} = \hat{d}_k + N_{track}\hat{T}_k$ of the time slot of the $(k+1)^{th}$ update period according to the synchronization symbol position $\hat{d}_k$ of the time slot of the $k^{th}$ update period and the inter-frame sampling derivation estimation value $\hat{T}_k$ of this update period; and a synchronization forecasting module 604, which is used for obtaining the synchronization symbol positions of other time slots in the update period according to the synchronization symbol position $\hat{d}_k$ of the time slot of the $k^{th}$ update period and the inter-frame sampling derivation estimation value $\hat{T}_k$ of the update period.

The initial synchronization symbol position obtaining module 601 further comprises:

an initial synchronization position obtaining unit, which is used for carrying out the coarse synchronization in the continuous $N_{coarse}$ time slots and obtaining $N_{coarse}$ normalized synchronization positions, which are $x_0, x_1, \ldots, x_{N_{coarse}-1}$ in sequence, and carrying out the median filtering on $x_0, x_1, \ldots, x_{N_{coarse}-1}$ to obtain the initial synchronization position $\hat{d}_{coarse}$;

a fine synchronization unit, which is used for obtaining the coarse positions of the synchronization symbols according to the initial synchronization position $\hat{d}_{coarse}$ and the period of the synchronization symbol occurring at the sending end; carrying out the fine synchronization for $N_{acq}$ times on the synchronization symbols in the continuous $N_{acq}$ time slots, and obtaining $N_{acq}$ normalized synchronization positions $x'_0, x'_1, \ldots, x'_{N_{acq}-1}$; and a filtering unit, which is used for obtaining the $\hat{d}_0$ after carrying out the median filtering on the $x'_0, x'_1, \ldots, x'_{N_{acq}-1}$.

The inter-frame sampling derivation estimation value obtaining module 602 further comprises:

an initial estimation unit 6021, which is used for obtaining the inter-frame sampling derivation estimation value $\hat{T}_0$ in the initial update period;

a tracking unit 6022, which is used for tracking the inter-frame sampling derivation of the $(k+1)^{th}$ update period, obtaining the inter-frame sampling derivation track value $\hat{T}_{track,k+1}$ of the $(k+1)^{th}$ update period, and the tracking way comprises: estimating the synchronization symbol position or the initial time slot or each frame in the $(k+1)^{th}$ update period, making subtraction to obtain the inter-frame sampling derivation of each adjacent frames, and obtaining the $\hat{T}_{track,k+1}$ according to the inter-frame sampling derivation of each adjacent frames;

a generation unit 6023, which is used for generating the inter-frame sampling derivation estimation value $\hat{T}_{k+1}$ of the $(k+1)^{th}$ update period according to the following formula:

$$\hat{T}_{k+1} = \begin{cases} \alpha \hat{T}_k + (1-\alpha)\hat{T}_{track,k+1}, & |\hat{T}_k - \hat{T}_{track,k+1}| \le Th_{dec} \\ \hat{T}_k & \text{others}; \end{cases}$$

wherein, $Th_{dec}$ is the judgment threshold of whether the track value is abnormal, $\alpha$ is the weighting factor, $0 \le \alpha \le 1$, $\hat{T}_k$ is the inter-frame sampling derivation estimation value of the $k^{th}$ update period, and $\hat{T}_{track,k+1}$ is the inter-frame sampling derivation track value of the $(k+1)^{th}$ update period, $k \ge 0$.

The initial estimation unit 6021 obtains the inter-frame sampling derivation estimation value $\hat{T}_0$ of the initial update period as the following way:

shifting M sampling points backwards from the position $\hat{d}_0$ after obtaining the synchronization symbol position $\hat{d}_0$ of the initial update period, wherein M is the number of the sampling points in one frame, and carrying out the fine synchronization for $N_{acq}$ times on the synchronization symbols in the continuous $N_{acq}$ time slots, obtaining $N_{acq}$ normalized synchronization positions $x''_0, x''_1, \ldots, x''_{N_{acq}-1}$, and obtaining $\hat{d}_{a1}$ after carrying out the median filtering on $x''_0, x''_1, \ldots, x''_{N_{acq}-1}$;

subtracting to obtain the inter-frame sampling derivation estimation value $\hat{T}_0 = \hat{d}_{a1} - \hat{d}_0$ in the initial update period.

The tracking unit 6022 comprises:

a cutting sub-unit, which is used for cutting and obtaining synchronization symbol of the same time slot of the next frame by shifting M sampling points backwards according to the synchronization symbol position $\hat{d}_{k+1}$ of the update period in the $(k+1)^{th}$ update period, wherein M is the number of the sampling points in each frame, and cutting for $N_{track}$ times altogether;

an estimation sub-unit, which carries out the fine synchronization estimation on the synchronization symbol cut every time, and obtains the new normalized synchronization position $\hat{d}_i$, $0 \le i \le N_{track} - 1$;

a sampling derivation estimation value obtaining sub-unit, which is used for obtaining the inter-frame sampling derivation estimation value $\hat{y}_i=\hat{d}_i$ according to the $\hat{d}_i$ obtained by the estimating sub-unit, $0 \le i \le N_{track}-1$;

a filtering sub-unit, which is used for carrying out the median filtering on the $\hat{y}_0, \hat{y}_1, \ldots, \hat{y}_{N_{track}-1}$ to obtain the inter-frame sampling derivation track value $\hat{T}_{track}$ of the $(k+1)^{th}$ update period.

The synchronization forecasting module 604 forecasts to obtain the value of synchronization symbol initial position $s_{i,j}^{(k)}$ of the $j^{th}$ time slot of the $i^{th}$ frame in the $k^{th}$ update period as the following way:

$$s_{i,j}^{(k)} = \hat{d}_k + \frac{\hat{T}_k}{N_{slot}} \cdot (N_{slot} \cdot i + j),$$

$$0 \le i \le N_{track}-1, 0 \le j \le N_{slot}-1;$$

wherein, the $N_{slot}$ is the number of the time slots included in each frame, and the $\hat{d}_k$ is the synchronization symbol position of the initial time slot of the $k^{th}$ update period.

Some embodiments can be applied in the broadcast system similar to the CMMB system.

The features of the technical scheme of the embodiments are as follows: (1) adopting the method of the median filtering of the continuous multiple time slots to enhance the robustness of the initial synchronization; (2) using the fine synchronization result of adjacent frames to estimate the inter-frame sampling derivation; (3) adopting the dual mechanisms of the median filtering and the synchronization reliability threshold judgment to ensure the robustness of the process of updating the inter-fame sampling derivation estimation; (4) making the best use of the period characteristic of the broadcast signal; (5) adjusting the timing synchronization position based on the synchronization forecast technique instead of carrying out the coarse synchronization and fine synchronization on each synchronization symbol, which reduces the calculation complexity. The signal synchronization method in the embodiments uses the result of the fine synchronization to estimate the inter-frame sampling derivation, and combines techniques of the synchronization forecast, median filtering, and synchronization reliability threshold judgment and so on to ensure the robustness of the system synchronization.

Certainly, the invention can also have other various embodiments, and various modifications and variations can be made according to the invention by those having ordinary skills in the art without departing from the spirit and essentiality of the present invention. Such modifications and variations shall all fall into the protection scope of the present invention.

INDUSTRIAL APPLICABILITY

The method and apparatus in the embodiments makes the best use of the feature of the frame structure of the China mobile multimedia physical layer, and implements the robust and precious timing synchronization position estimation. When a certain frame signal is interrupted, the traditional synchronization technique will loss the synchronization position, which causes the system to be restarted; however, the method and apparatus in the embodiments is able to track the synchronization position although several frame signals is interrupted. Besides, the abnormal values of the result of the fine synchronization will occur when the deep fading of synchronization symbol occurs; and the method and apparatus in the embodiments eliminates the abnormal values by adopting techniques of the synchronization forecast, median filtering, and synchronization reliability threshold judgment and so on, which improves the robustness of the system synchronization greatly.

What is claimed is:

1. A synchronization method, comprising:
    obtaining a synchronization symbol position $\hat{d}_0$ of one time slot of an initial update period;
    adjusting the synchronization symbol position according to an update period $N_{track}$, and the step of adjusting the synchronization symbol position comprising:
    obtaining a synchronization symbol position $\hat{d}_{k+1}$ of a corresponding time slot of a (k+1)th update period according to a synchronization symbol position $\hat{d}_k$ of a corresponding time slot of a kth update period and an inter-frame sampling derivation estimation value $\hat{T}_k$ of said kth update period according to the formula: $\hat{d}_{k+1} = \hat{d}_k + N_{track}\hat{T}_k$; wherein the corresponding time slot refers to a time slot corresponding to a position of said time slot of said initial update period; wherein an inter-frame sampling derivation estimation value $\hat{T}_{k+1}$ of the (k+1)th update period is a weighted sum of the inter-frame sampling derivation estimation value $\hat{T}_k$ of the kth update period and an inter-frame sampling derivation track value $\hat{T}_{track}$ of the (k+1)th update period, and an initial inter-frame sampling derivation estimation value $\hat{T}_0$ is obtained by capturing the inter-frame sampling derivations; the inter-frame sampling derivation track value $\hat{T}_{track}$ of the (k+1)th update period is obtained by: estimating the synchronization symbol position of the initial time slot of each frame in the (k+1)th update period, making the subtraction to obtain the inter-frame sampling derivation of each adjacent frames, and obtaining the inter-frame sampling derivation track value $\hat{T}_{track}$ of the (k+1)th update period according to the inter-frame sampling derivation of each adjacent frames;
    obtaining synchronization symbol positions of other time slots in said kth update period according to the synchronization symbol position $\hat{d}_k$ of the corresponding time slot of the kth update period and the inter-frame sampling derivation estimation value $\hat{T}_k$ of said kth update period, wherein the inter-frame sampling derivation estimation value $\hat{T}_k$ refers to an estimation value of a synchronization symbol position derivation in one frame, $k \ge 0$;
    so as to implement a timing synchronization.

2. The method as claimed in claim 1, wherein the step of obtaining the synchronization symbol position $\hat{d}_0$ of said time slot of the initial update period comprises:
    carrying out a coarse synchronization in continuous $N_{coarse}$ time slots to obtain $N_{coarse}$ normalized synchronization positions $x_0, x_1, \ldots, x_{N_{coarse}-1}$, and carrying out median filtering on the $x_0, x_1, \ldots, x_{N_{coarse}-1}$ to obtain an initial synchronization position $\hat{d}_{coarse}$; wherein the $N_{coarse}$ is the number of time slots searched continuously in the coarse synchronization;
    obtaining coarse positions of synchronization symbols according to the initial synchronization position $\hat{d}_{coarse}$ and a period of the synchronization symbols occurring in a sending end;
    carrying out a fine synchronization for $N_{acq}$ times on the synchronization symbols in continuous $N_{acq}$ time slots to obtain $N_{acq}$ normalized synchronization positions $x'_0, x'_1, \ldots, x'_{N_{acq}-1}$, and obtaining said synchronization symbol position $\hat{d}_0$ after carrying out the median filtering on the $x'_0, x'_1, \ldots, x'_{N_{acq}-1}$; wherein, the $N_{acq}$ is the number of time slots searched continuously in inter-frame sampling capturing.

3. The method as claimed in claim 1, wherein an inter-frame sampling derivation estimation value $\hat{T}_{k+1}$ of the (k+1)th update period is obtained by a following formula:

$$\hat{T}_{k+1} = \begin{cases} \alpha \hat{T}_k + (1-\alpha)\hat{T}_{track,k+1}, & |\hat{T}_k - \hat{T}_{track,k+1}| \le Th_{dec} \\ \hat{T}_k & \text{others}; \end{cases}$$

wherein, the $Th_{dec}$ is a judgment threshold of whether a track value is abnormal, the $\alpha$ is a weighting factor, $0 \ge \alpha \ge 1$, the $\hat{T}_k$ is the inter-frame sampling derivation estimation value of the kth update period, the $\hat{T}_{track,k+1}$ is an inter-frame sampling derivation track value of the (k+1)th update period, k≥0, the inter-frame sampling derivation estimation value of the initial update period is $\hat{T}_0$; and a way of calculating the $\hat{T}_{track,k+1}$ comprises: estimating the synchronization symbol position of an initial time slot of each frame in the (k+1)th update period, making subtraction on the synchronization symbol positions of the initial time slots of all the frames to obtain an inter-frame sampling derivation of each adjacent frames, and obtaining the $\hat{T}_{track,k+1}$ according to the inter-frame sampling derivation of each adjacent frames.

4. The method as claimed in claim 3, wherein the inter-frame sampling derivation estimation value $\hat{T}_0$ of the initial update period is obtained by following steps:
shifting the synchronization symbol position $\hat{d}_0$ M sampling points backwards after obtaining the synchronization symbol position $\hat{d}_0$ of the initial update period, wherein the M is the number of sampling points in one frame, carrying out the fine synchronization for $N_{acq}$ times on the synchronization symbols in the continuous $N_{acq}$ time slots to obtain $N_{acq}$ normalized synchronization positions $x''_0, x''_1, \ldots, x''_{N_{acq}-1}$, and obtaining $\hat{d}_{a1}$ after carrying out the median filtering on the $x''_0, x''_1, \ldots, x''_{N_{acq}-1}$; and
making subtraction on the $\hat{d}_{a1}$ and $\hat{d}_{a2}$ to obtain the inter-frame sampling derivation estimation value $\hat{T}_0 = \hat{d}_{a1} - \hat{d}_0$ in the initial update period.

5. The method as claimed in claim 3, wherein the inter-frame sampling derivation track value $\hat{T}_{track,k+1}$ of the (k+1)$^{th}$ update period is obtained by following steps:
3a, in the (k+1)th update period, shifting the synchronization symbol position $\hat{d}_{k+1}$ of the corresponding time slot of the synchronization symbol of the (k+1)th update period M sampling points backwards to cut and obtain a synchronization symbol of a corresponding time slot of a next frame, wherein, M is the number of sampling points of each frame;
3b, carrying out a fine synchronization estimation on the cut synchronization symbol to obtain a new normalized synchronization symbol position $\hat{d}_i$, and taking an initial position of the cut synchronization symbol during normalization as 0;
3c, obtaining the inter-frame sampling derivation estimation value $\hat{y}_i = \hat{d}_i$ of once;
3d, estimating $N_{track}$ inter-frame sampling derivation estimation values $\hat{y}_0, \hat{y}_1, \ldots, \hat{y}_{N_{track}-1}$ in the (k+1)th update period according to the above steps 3a, 3b and 3c;
3e, carrying out the median filtering on the $\hat{y}_0, \hat{y}_1, \ldots, \hat{y}_{N_{track}-1}$ to obtain the inter-frame sampling derivation track value $\hat{T}_{track}$ of the (k+1)th update period.

6. The method as claimed in claim 1, wherein:
if the corresponding time slot of the kth update period is an initial time slot of the kth update period, then a value of a synchronization symbol position $s_{i,j}^{(k)}$ of a $j^{th}$ time slot of a $i^{th}$ frame in other time slots in the kth update period is as follows:

$$s_{i,j}^{(k)} = \hat{d}_k + \frac{\hat{T}_k}{N_{slot}} \cdot (N_{slot} \cdot i + j),$$

$$0 \le i \le N_{track} - 1, 0 \le j \le N_{slot} - 1;$$

wherein, the $N_{slot}$ is the number of time slots included in each frame.

7. A synchronization apparatus, comprising at least one processor; and memory storing computer program code;
wherein the memory storing the computer program code is configured to, with the at least one processor, cause the apparatus to perform actions comprising at least:
an initial synchronization symbol position obtaining module (601), which is configured to obtain a synchronization symbol position $\hat{d}_0$ of one time slot of an initial update period;
an inter-frame sampling derivation estimation value obtaining module (602), which is configured to obtain an inter-frame sampling derivation estimation value $\hat{T}_k$ of a kth update period; wherein, the inter-frame sampling derivation estimation value $\hat{T}_k$ refers to an estimation value of a synchronization symbol position derivation in one frame, k≥0; wherein an inter-frame sampling derivation estimation value $\hat{T}_{k+1}$ of the (k+1)th update period is a weighted sum of the inter-frame sampling derivation estimation value $\hat{T}_k$ of the kth update period and an inter-frame sampling derivation track value $\hat{T}_{track}$ of the (k+1)th update period, and an initial inter-frame sampling derivation estimation value $\hat{T}_0$ is obtained by capturing the inter-frame sampling derivations; the inter-frame sampling derivation track value $\hat{T}_{track}$ of the (k+1)th update period is obtained by: estimating the synchronization symbol position of the initial time slot of each frame in the (k+1)th update period, making the subtraction to obtain the inter-frame sampling derivation of each adjacent frames, and obtaining the inter-frame sampling derivation track value $\hat{T}_{track}$ of the (k+1)th update period according to the inter-frame sampling derivation of each adjacent frames;
an updating module (603), which is configure to: take $N_{track}$ frames as an update period, obtain a synchronization symbol position $\hat{d}_{k+1}$ of a corresponding time slot of a (k+1)th update period according to a synchronization symbol position $\hat{d}_k$ of a corresponding time slot of the kth update period and the inter-frame sampling derivation estimation value $\hat{T}_k$ of said kth update period according to the formula: $\hat{d}_{k+1} = \hat{d}_k + N_{track}\hat{T}_k$; wherein, the corresponding time slot refers to a time slot corresponding to a position of said time slot of said initial update period; and
a synchronization forecasting module (604), which is configured to obtain synchronization symbol positions of other time slots in said kth update period according to the synchronization symbol position $\hat{d}_k$ of the corresponding time slot of the kth update period and the inter-frame sampling derivation estimation value $\hat{T}_k$ of said kth update period;
so as to implement a timing synchronization.

8. The apparatus as claimed in claim 7, wherein said initial synchronization symbol position obtaining module (601) comprises:

an initial synchronization position obtaining unit, which is configured to carry out a coarse synchronization in continuous $N_{coarse}$ time slots to obtain $N_{coarse}$ normalized synchronization positions $x_0, x_1, \ldots, x_{N_{coarse}-1}$, and carry out a median filtering on the $x_0, x_1, \ldots, x_{N_{coarse}-1}$ to obtain an initial synchronization position $\hat{d}_{coarse}$; wherein, the $N_{coarse}$ is the number of time slots searched continuously in the coarse synchronization;

a fine synchronization unit, which is configured to obtain coarse positions of synchronization symbols according to the initial synchronization position $\hat{d}_{coarse}$ and a period of the synchronization symbols occurring in a sending end, carry out a fine synchronization for $N_{acq}$ times on the synchronization symbols in continuous $N_{acq}$ time slots to obtain $N_{acq}$ normalized synchronization positions $x'_0, x'_1, \ldots, x'_{N_{acq}-1}$; and a filtering unit, which is configured to obtain said synchronization symbol position $\hat{d}_0$ after carrying out the median filtering on the $x'_0, x'_1, \ldots, x'_{N_{acq}-1}$; wherein, the $N_{acq}$ is the number of time slots searched continuously in inter-frame sampling capturing.

9. The apparatus as claimed in claim 7, wherein said inter-frame sampling derivation estimation value obtaining module (602) comprises:

an initial estimation unit (6021), which is configured to obtain the inter-frame sampling derivation estimation value $\hat{T}_0$ of the initial update period;

a tracking unit (6022), which is configured to track inter-frame sampling derivations of the (k+1)th update period, and obtain an inter-frame sampling derivation track value $\hat{T}_{track,k+1}$ of (k+1)th update period, wherein, the $\hat{T}_{track,k+1}$ is obtained by estimating the synchronization symbol position of an initial time slot of each frame in the (k+1)th update period, making subtraction on the synchronization symbol positions of the initial time slot of each frame to obtain the inter-frame sampling derivation of each adjacent frames, and obtaining the $\hat{T}_{track,k+1}$ according to the inter-frame sampling derivation of each adjacent frames; and a generation unit (6023), which is configured to generate the inter-frame sampling derivation estimation value $\hat{T}_{k+1}$ of the (k+1)th update period by a following formula:

$$\hat{T}_{k+1} = \begin{cases} \alpha \hat{T}_k + (1-\alpha)\hat{T}_{track,k+1}, & |\hat{T}_k - \hat{T}_{track,k+1}| \leq Th_{dec} \\ \hat{T}_k & others; \end{cases}$$

wherein, the $Th_{dec}$ is a judgment threshold of whether a track value is abnormal, the $\alpha$ is a weighting factor, $0 \leq \alpha \leq 1$, the $\hat{T}_k$ is the inter-frame sampling derivation estimation value of the kth update period, the $\hat{T}_{track,k+1}$ is the inter-frame sampling derivation track value of the (k+1)th update period, and k≥0.

10. The apparatus as claimed in claim 9, wherein said initial estimating unit (6021) is configured to obtain the inter-frame sampling derivation estimation value $\hat{T}_0$ of the initial update period as a following way:

shifting the synchronization symbol position $\hat{d}_0$ M sampling points backwards after obtaining the synchronization symbol position $\hat{d}_0$ of the initial update period, wherein the M is the number of sampling points in one frame, carrying out the fine synchronization for $N_{acq}$ times on the synchronization symbols in the continuous $N_{acq}$ time slots to obtain $N_{acq}$ normalized synchronization positions $x''_0, x''_1, \ldots, x''_{N_{acq}-1}$, and obtaining $\hat{d}_{a1}$ after carrying out the median filtering on the $x''_0, x''_1, \ldots, x''_{N_{acq}-1}$; and making subtraction on the $\hat{d}_{a1}$ and $\hat{d}_0$ to obtain the inter-frame sampling derivation estimation value $\hat{T}_0 = \hat{d}_{a1} - \hat{d}_0$ in the initial update period.

11. The apparatus as claimed in claim 9, wherein said tracking unit (6022) comprises:

a cutting sub-unit, which is configured to, in the (k+1)th update period, shift the synchronization symbol position $\hat{d}_{k+1}$ of the corresponding time slot of the synchronization symbol of the (k+1)th update period M sampling points backwards to cut and obtain a synchronization symbol of a corresponding time slot of a next frame, wherein, M is the number of sampling points of each frame, and the number of cutting and obtaining is $N_{track}$;

an estimation sub-unit, which is configured to carry out a fine synchronization estimation on the cut synchronization symbol every time to obtain a new normalized synchronization symbol position $\hat{d}_i$, $0 \leq i \leq N_{track}-1$, and take an initial position of the cut synchronization symbol during normalization as 0;

an sampling derivation estimation value obtaining sub-unit, which is configured to obtain the inter-frame sampling derivation estimation value $\hat{y}_i = \hat{d}_i$ according to the normalized synchronization symbol position $\hat{d}_i$ obtained by the estimation sub-unit, $0 \leq i \leq N_{track}-1$; and a filtering sub-unit, which is configured to: carry out the median filtering on the $\hat{y}_0, \hat{y}_1, \ldots, \hat{y}_{N_{track}-1}$ to obtain the inter-frame sampling derivation track value $\hat{T}_{track}$ of the (k+1)th update period.

12. The apparatus as claimed in claim 7, wherein said synchronization forecasting module (604) is configured to obtain the synchronization symbol positions of other time slots in said kth update period when the corresponding time slot of the kth update period is an initial time slot of the kth update period as a following way:

a value of a synchronization symbol position $s_{i,j}^{(k)}$ of a jth time slot of a ith frame in the other time slots being as follows:

$$s_{i,j}^{(k)} = \hat{d}_k + \frac{\hat{T}_k}{N_{slot}} \cdot (N_{slot} \cdot i + j),$$

$$0 \leq i \leq N_{track} - 1, 0 \leq j \leq N_{slot} - 1;$$

wherein, the $N_{slot}$ is the number of time slots included in each frame, and said $\hat{d}_k$ is the synchronization symbol position of the initial time slot of the kth update period.

13. The method as claimed in claim 2, wherein an inter-frame sampling derivation estimation value $\hat{T}_{k+1}$ of the (k+1)th update period is obtained by a following formula:

$$\hat{T}_{k+1} = \begin{cases} \alpha \hat{T}_k + (1-\alpha)\hat{T}_{track,k+1}, & |\hat{T}_k - \hat{T}_{track,k+1}| \leq Th_{dec} \\ \hat{T}_k & others; \end{cases}$$

wherein, the $Th_{dec}$ is a judgment threshold of whether a track value is abnormal, the $\alpha$ is a weighting factor, $0 \leq \alpha \leq 1$, the $\hat{T}_k$ is the inter-frame sampling derivation estimation value of the kth update period, the $\hat{T}_{track,k+1}$ is an inter-frame sampling derivation track value of the (k+1)th update period, k≥0, the inter-frame sampling derivation estimation value of the initial update period is $\hat{T}_0$; and a way of calculating the $\hat{T}_{track,k+1}$ comprises: estimating the synchronization symbol position of an initial time slot of each frame in the (k+1)th update period, making subtraction on the synchronization symbol positions of the initial time slots of all the frames to obtain an inter-frame sampling derivation of each adjacent frames, and obtaining the $\hat{T}_{track,k+1}$ according to the inter-frame sampling derivation of each adjacent frames.

14. The method as claimed in claim 13, wherein the inter-frame sampling derivation estimation value $\hat{T}_0$ of the initial update period is obtained by following steps:
shifting the synchronization symbol position $\hat{d}_0$ M sampling points backwards after obtaining the synchronization symbol position $\hat{d}_0$ of the initial update period, wherein the M is the number of sampling points in one frame, carrying out the fine synchronization for $N_{acq}$ times on the synchronization symbols in the continuous $N_{acq}$ time slots to obtain $N_{acq}$ normalized synchronization positions $x''_0, x''_1, \ldots, x''_{N_{acq}-1}$, and obtaining $\hat{d}_{a1}$ after carrying out the median filtering on the $x''_0, x''_1, \ldots, x''_{N_{acq}-1}$; and
making subtraction on the $\hat{d}_{a1}$ and $\hat{d}_0$ to obtain the inter-frame sampling derivation estimation value $\hat{T}_0 = \hat{d}_{a1} - \hat{d}_0$ in the initial update period.

15. The method as claimed in claim 13, wherein the inter-frame sampling derivation track value $\hat{T}_{track,k+1}$ of the (k+1)th update period is obtained by following steps:
3a, in the (k+1)th update period, shifting the synchronization symbol position $\hat{d}_{k+1}$ of the corresponding time slot of the synchronization symbol of the (k+1)th update period M sampling points backwards to cut and obtain a synchronization symbol of a corresponding time slot of a next frame, wherein, M is the number of sampling points of each frame;
3b, carrying out a fine synchronization estimation on the cut synchronization symbol to obtain a new normalized synchronization symbol position $\hat{d}_i$, and taking an initial position of the cut synchronization symbol during normalization as 0;
3c, obtaining the inter-frame sampling derivation estimation value $\hat{y}_i = \hat{d}_i$ of once;
3d, estimating $N_{track}$ inter-frame sampling derivation estimation values $\hat{y}_0, \hat{y}_1, \ldots, \hat{y}_{N_{track}-1}$ in the (k+1)th update period according to the above steps 3a, 3b and 3c;
3e, carrying out the median filtering on the $\hat{y}_0, \hat{y}_1, \ldots, \hat{y}_{N_{track}-1}$ to obtain the inter-frame sampling derivation track value $\hat{T}_{track}$ of the (k+1)th update period.

16. The apparatus as claimed in claim 8, wherein said inter-frame sampling derivation estimation value obtaining module (602) comprises:
an initial estimation unit (6021), which is configured to obtain the inter-frame sampling derivation estimation value $\hat{T}_0$ of the initial update period;
a tracking unit (6022), which is configured to track inter-frame sampling derivations of the (k+1)th update period, and obtain an inter-frame sampling derivation track value $\hat{T}_{track,k+1}$ of (k+1)th update period, wherein, the $\hat{T}_{track,k+1}$ is obtained by estimating the synchronization symbol position of an initial time slot of each frame in the (k+1)th update period, making subtraction on the synchronization symbol positions of the initial time slot of each frame to obtain the inter-frame sampling derivation of each adjacent frames, and obtaining the $\hat{T}_{track,k+1}$ according to the inter-frame sampling derivation of each adjacent frames; and
a generation unit (6023), which is configured to generate the inter-frame sampling derivation estimation value $\hat{T}_{k+1}$ of the (k+1)th update period by a following formula:

$$\hat{T}_{k+1} = \begin{cases} \alpha \hat{T}_k + (1-\alpha)\hat{T}_{track,k+1}, & |\hat{T}_k - \hat{T}_{track,k+1}| \leq Th_{dec} \\ \hat{T}_k & \text{others;} \end{cases}$$

wherein, the $Th_{dec}$ is a judgment threshold of whether a track value is abnormal, the $\alpha$ is a weighting factor, $0 \leq \alpha \leq 1$, the $\hat{T}_k$ is the inter-frame sampling derivation estimation value of the kth update period, the $\hat{T}_{track,k+1}$ is the inter-frame sampling derivation track value of the (k+1)th update period, and k≥0.

17. The apparatus as claimed in claim 16, wherein said initial estimating unit (6021) is configured to obtain the inter-frame sampling derivation estimation value $\hat{T}_0$ of the initial update period as a following way:
shifting the synchronization symbol position $\hat{d}_0$ M sampling points backwards after obtaining the synchronization symbol position $\hat{d}_0$ of the initial update period, wherein the M is the number of sampling points in one frame, carrying out the fine synchronization for $N_{acq}$ times on the synchronization symbols in the continuous $N_{acq}$ time slots to obtain $N_{acq}$ normalized synchronization positions $x''_0, x''_1, \ldots, x''_{N_{acq}-1}$, and obtaining $\hat{d}_{a1}$ after carrying out the median filtering on the $x''_0, x''_1, \ldots, x''_{N_{acq}-1}$; and making subtraction on the $\hat{d}_{a1}$ and $\hat{d}_0$ to obtain the inter-frame sampling derivation estimation value $\hat{T}_0 = \hat{d}_{a1} - \hat{d}_0$ in the initial update period.

18. The apparatus as claimed in claim 16, wherein said tracking unit (6022) comprises:
a cutting sub-unit, which is configured to, in the (k+1)th update period, shift the synchronization symbol position $\hat{d}_{k+1}$ of the corresponding time slot of the synchronization symbol of the (k+1)th update period M sampling points backwards to cut and obtain a synchronization symbol of a corresponding time slot of a next frame, wherein, M is the number of sampling points of each frame, and the number of cutting and obtaining is $N_{track}$;
an estimation sub-unit, which is configured to carry out a fine synchronization estimation on the cut synchronization symbol every time to obtain a new normalized synchronization symbol position $\hat{d}_i$, $0 \leq i \leq N_{track}-1$, and take an initial position of the cut synchronization symbol during normalization as 0;
an sampling derivation estimation value obtaining sub-unit, which is configured to obtain the inter-frame sampling derivation estimation value $\hat{y}_i = \hat{d}_i$ according to the normalized synchronization symbol position $\hat{d}_i$ obtained by the estimation sub-unit, $0 \leq i \leq N_{track}-1$; and
a filtering sub-unit, which is configured to: carry out the median filtering on the $\hat{y}_0, \hat{y}_1, \ldots, \hat{y}_{N_{track}-1}$ to obtain the inter-frame sampling derivation track value $\hat{T}_{track}$ of the (k+1)th update period.

* * * * *